US009401639B2

(12) United States Patent
Philbrick et al.

(10) Patent No.: US 9,401,639 B2
(45) Date of Patent: Jul. 26, 2016

(54) INJECTION LOCKED PHASING FOR A PEAK-VALLEY MULTIPHASE REGULATOR

(71) Applicant: INTERSIL AMERICAS LLC, Milpitas, CA (US)

(72) Inventors: Rhys S. A. Philbrick, San Jose, CA (US); Emil Chen, San Jose, CA (US); Ruchi J. Parikh, Mountain View, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 314 days.

(21) Appl. No.: 14/099,537

(22) Filed: Dec. 6, 2013

(65) Prior Publication Data

US 2015/0067358 A1 Mar. 5, 2015

Related U.S. Application Data

(60) Provisional application No. 61/873,171, filed on Sep. 3, 2013.

(51) Int. Cl.
*G06F 1/28* (2006.01)
*H02M 3/158* (2006.01)

(52) U.S. Cl.
CPC .............. *H02M 3/158* (2013.01); *G06F 1/28* (2013.01); *H02M 2003/1586* (2013.01)

(58) Field of Classification Search
CPC .. G06F 1/26; H02M 2003/1586; H02M 3/158
See application file for complete search history.

(56) References Cited

U.S. PATENT DOCUMENTS

| | | | |
|---|---|---|---|
| 2004/0070382 A1* | 4/2004 | Walters | H02J 1/102 323/284 |
| 2010/0033152 A1* | 2/2010 | Chen | H02M 3/158 323/288 |
| 2010/0066319 A1* | 3/2010 | Qiu | H02M 3/1584 323/272 |
| 2012/0043950 A1* | 2/2012 | Truong | H02M 3/158 323/282 |
| 2013/0058384 A1* | 3/2013 | Otis | G06F 7/68 375/219 |
| 2014/0176091 A1* | 6/2014 | Chiang | H02M 3/158 323/234 |

* cited by examiner

*Primary Examiner* — Thomas Lee
*Assistant Examiner* — Mohammad A Rahman
(74) *Attorney, Agent, or Firm* — Gary Stanford; Huffman Law Group, PC

(57) ABSTRACT

A system and method capable of injection locking the phases of a peak-valley multiphase regulator includes comparing an output voltage error signal with a ramp control signal and providing a corresponding slope reset signal, using transitions of the slope reset signal to develop a equally spaced high side ramp signals and equally spaced low side ramp signals, and injecting a corresponding one of the high side signals and a corresponding one of the low side ramp signals into each of the phases which correspondingly develop equally spaced pulse control signals for multiphase operation. Such injection locking allows the additional phases to operate out of phase with the first phase and allows operation at high duty cycles.

21 Claims, 5 Drawing Sheets

US 9,401,639 B2

INJECTION LOCKED PHASING FOR A PEAK-VALLEY MULTIPHASE REGULATOR

CROSS-REFERENCE TO RELATED APPLICATIONS

This application claims the benefit of U.S. Provisional Application Ser. No. 61/873,171, filed on Sep. 3, 2013 which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

Existing multiphase current mode buck switchers (or regulators) are based off of traditional peak or valley current architectures and only perform well at limited duty cycles (e.g., about 30% or less). Some multiphase architectures would need to be detuned to operate at duty cycles above about 30%. An alternative is a peak-valley current mode regulator with a conventional PLL. The tuning of the PLL, however, interacts with the voltage loop such that fast transient response and good phase separation was not achievable with PLL tuning Voltage mode regulators do not have as much inherent phase margin as peak-valley current mode regulators. Another conventional approach has been to add slope compensation. Slope compensation provided some transient response and phase separation improvement, but did not solve the primary issue.

An injection locked phasing system and method as described herein uses injection locking for a peak-valley multiphase regulator to make each of the phase circuits operate out of phase with respect to each other. The injection locking provides phasing between the phase circuits that enables efficient operation at higher duty cycles (e.g., above 30%) without tuning and without compromising performance. The present architecture offers the benefits of current mode regulators without duty cycle limitations. The present architecture enables smaller output filters (e.g., smaller output inductor and/or smaller output capacitor) and/or enables better load transient performance. The present architecture allows a load, such as a processor or the like, to run faster and/or more efficiently.

Figure 1:
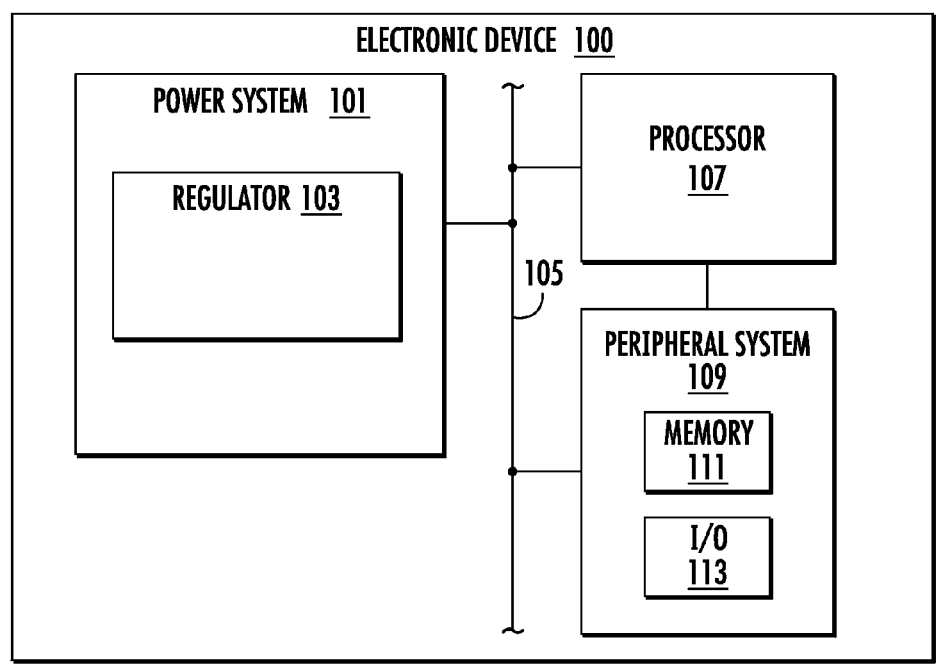
FIG. 1 is a simplified block diagram of a computer system configured with a power supply including a regulator implemented according to an embodiment of the present invention.

FIG. 1 is a simplified block diagram of a computer system 100 configured with a power supply 101 including a regulator 103 implemented according to an embodiment of the present invention. The power supply 101 develops one or more supply voltages which provide power to other system devices of the computer system 100 via a connection system 105. The connection system 105 may be a bus system or switch system or a set of conductors or the like. In the illustrated embodiment, the computer system 100 includes a processor 107 and a peripheral system 109 both coupled to the connection system 105 to receive supply voltages from the power supply 101. In the illustrated embodiment, the peripheral system 109 may include any combination of a system memory 111 (e.g., including any combination of RAM (random access) and ROM (read only) memory type devices and memory controllers and the like), and an input/output (I/O) system 113, which may include system controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

Figure 2:
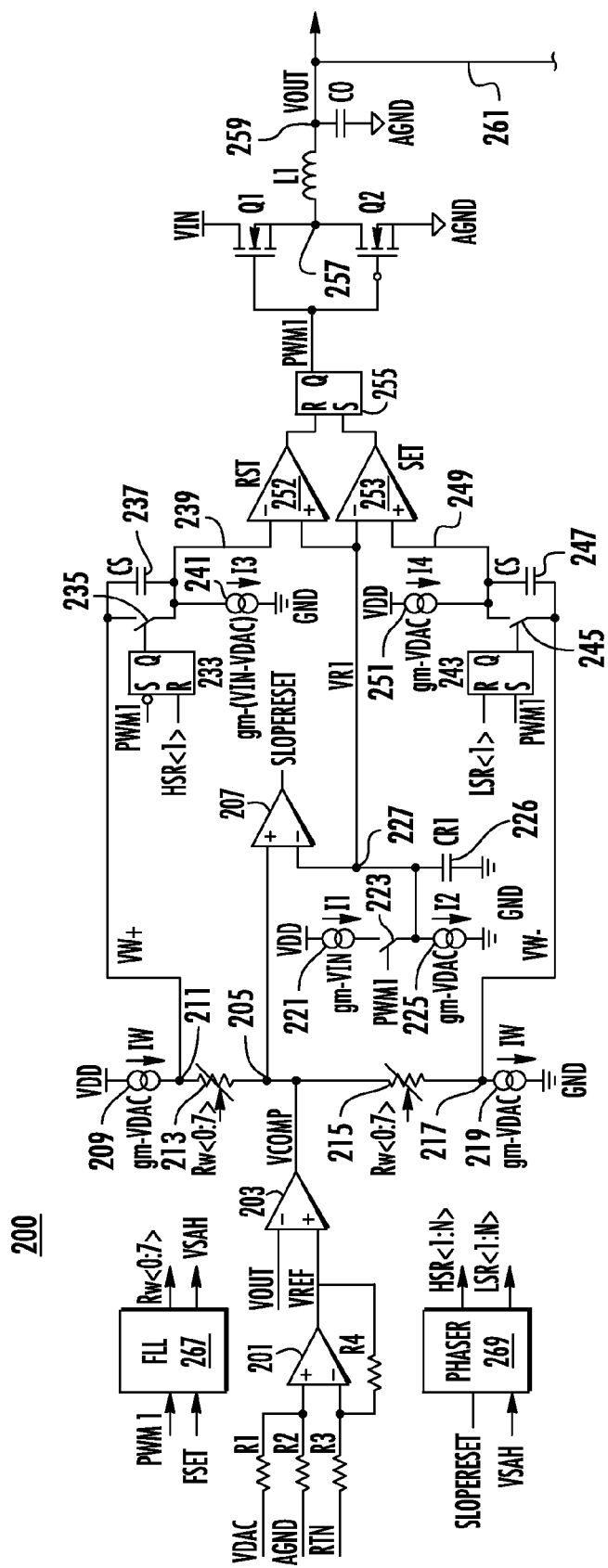
FIG. 2 is a simplified schematic and block diagram of a first phase circuit with additional control circuitry of the regulator of FIG. 1 according to one embodiment.

FIG. 2 is a simplified schematic and block diagram of a first phase circuit 200 with additional control circuitry of the regulator 103 according to one embodiment. The regulator 103 is implemented as a multiphase peak-valley current mode regulator. As described herein, the regulator 103 uses injection locking to make multiple phases of the regulator operate out of phase with respect to each other for faster and/or more efficient operation.

A voltage VDAC is provided which indicates a target voltage level of the output voltage VOUT. VDAC, along with an analog ground (AGND) signal provided via resistive devices R1 and R2, respectively, to a positive input and a return (RTN) signal is provided through a resistor R3 to a negative input of an amplifier 201 (such as an operational amplifier or the like), which develops a reference voltage VREF at its output. A feedback resistor R4 is coupled between the negative input and output of the amplifier 201. In general, ground is sensed at the load, such as at the processor 107 or the like, and the amplifier 201 is used to generate an appropriate offset for adjusting VDAC to provide a more accurate reference voltage level provided by VREF.

VOUT (or a feedback version thereof) is provided to the negative (or inverting) input of an error amplifier 203, which receives VREF at its positive (or non-inverting) input, and which provides a compensation voltage VCOMP at its output. In general, VREF indicates a target voltage level of VOUT, and VCOMP, which indicates an amount error of VOUT, is generated as a control signal in the control loop to regulate the voltage level of VOUT to the desired level. VCOMP may also be referred to as an output voltage error signal.

VCOMP is asserted on a node 205 which is coupled to the positive input of a comparator 207. A first current source 209 is coupled between a source or supply voltage, shown as VDD, and an upper window node 211 developing an upper window voltage VW+. A first adjustable window resistor 213 is coupled between nodes 211 and 205 and receives a resistor control value RW for determining or otherwise controlling the resistive value of the window resistor 213. In the illustrated embodiment, RW is an 8-bit digital value shown as RW<0:7>, although alternative and/or analog control embodiments are contemplated. The current source 209 develops a window current IW provided to node 211. In one embodiment, the window current IW is determined as a transconductance gain "gm" multiplied by the voltage VDAC, or gm·VDAC. The current source 209 may be implemented as a transconductance amplifier or the like receiving VDAC and generating IW based on its transconductance gain gm.

A second adjustable window resistor 215 is coupled between node 205 and a lower window node 217 developing a lower window voltage VW−. The window resistor 215 also receives the resistor control value RW for determining or otherwise controlling the resistive value of the window resistor 215. A second current source 219 is coupled between node 217 and a reference node, such as ground (GND). The current source 219 also develops the window current IW, which is drawn from the node 217. The current source 219 may also be implemented as a transconductance amplifier or the like receiving VDAC and generating IW based on its transconductance gain gm.

Another current source 221 is coupled between VDD and a first switched terminal of a single-pole, single-throw (SPST) switch 223, having its other switched terminal coupled to a ripple node 227. Another current source 225 is coupled between node 227 and GND. A ripple capacitor 226 with capacitance "CR1" is coupled between the ripple node 227 and GND. The current sources 221 and 225 may each be implemented with transconductance amplifiers or the like with transconductance gain gm in a similar manner as for the current sources 209 and 219. The current source 221 develops a current I1=gm·VIN and the current source 225 develops a current I2=gm·VDAC, in which VIN is an input voltage of the regulator 103. Thus, the current I1 is generally proportional to the input voltage VIN. VDAC has a level indicative (or the target voltage level) of VOUT, so that the current I2 is proportional to the output voltage VOUT.

The switch 223 may be implemented as a transistor device or the like. The switch 223 has a control input receiving a pulse width modulation (PWM) signal PWM1 for the first phase or phase 1. The PWM1 signal transitions between "active and "inactive" states at a controlled duty cycle for converting VIN to VOUT. In one embodiment, when PWM1 is "active" or otherwise asserted high, it closes the switch 223 and when it is "inactive" or asserted low, the switch 223 is opened. The current sources 221 and 225, the switch 223 and the capacitor 226 collectively form a voltage generator for developing a ripple voltage VR1 on the ripple node 227. VR1 is a ramp control signal that ramps up when PWM1 is active and that ramps down when PWM1 is inactive. The crossing or intersection between VCOMP and VR1 establishes the timing of the transitions of PWM1 as further described herein.

VR1 is provided to a negative input of the comparator 207. The output of the comparator 207 asserts a signal SLOPERE-SET. A high side trigger signal HSR<1> is provided to the reset (R) input of a set-reset flip-flop (SRFF) 233, receiving PWM1 at its inverted set (S) input. The non-inverted or Q output of the SRFF 233 is provided to the control input of a SPST switch 235 (which may be implemented using a transistor device or the like). A first switched terminal of the switch 235 is coupled to node 211 (voltage VW+) and its other switched terminal is coupled to a node 239. A slope capacitor 237 with capacitance "CS" is coupled between nodes 211 and 239, in which capacitances CS and CR1 may be equal. A current source 241 is coupled between node 239 and GND and draws a current I3=gm(VIN−VDAC) from node 239 to GND. The current source 241 may also be implemented with a transconductance amplifier or the like with transconductance gain gm. In this case, the current source 241 develops a current I3 which is proportional to the difference between VIN and VOUT. Node 239 is coupled to the negative input of a reset (RST) comparator 252. The SRFF 233, the switch 235, the capacitor 237, and the current source 241 collectively form a high side ramp generator.

A low side trigger signal LSR<1> is provided to the reset input of another SRFF 243, receiving PWM1 at its set input. The Q output of the SRFF 243 is provided to the control input of another SPST switch 245 (which also may be implemented using a transistor device or the like). A first switched terminal of the switch 245 is coupled to node 217 (voltage VW−) and its other switched terminal is coupled to a node 249. Another slope capacitor 247 with capacitance "CS" is coupled between nodes 217 and 249. A current source 251 is coupled between node 249 and VDD and provides a current I4=gm·VDAC to node 249 (from VDD or other source voltage). The current source 251 may be implemented with a transconductance amplifier or the like with transconductance gain gm in a similar manner previously described for the other current sources. In this case, the current I4 is proportional to the output voltage VOUT (as indicated by VDAC). The SRFF 243, the switch 245, the capacitor 247, and the current source 251 collectively form a low side ramp generator.

Node 249 is coupled to the positive input of a set (SET) comparator 253. The ripple node 227 developing VR1 is coupled to the positive input of the RST comparator 252 and to the negative input of the SET comparator 253. The output of the RST comparator 252 is provided to the reset input of another SRFF 255 and the output of the SET comparator 253 is provided to the set input of the SRFF 255. The comparators 252 and 253 and the SRFF 255 collectively form a comparator and latch circuit for developing PWM1. The Q output of the SRFF 255 asserts the PWM1 signal for phase 1, which is shown provided to the gate of a first electronic switch Q1. The PWM1 signal is also shown inverted (inverting bubble) and then provided to the gate of a second electronic switch Q2. It is understood that the depicted illustration is simplified. A PWM signal (including PWM1) is typically provided to a driver (not show) which asserts one or the other of the switches Q1 and Q2. When PWM1 goes high, Q1 is turned off while Q2 is turned on. When PWM1 goes low, Q1 is turned off and Q2 is turned on.

The driver may include control circuitry or the like to ensure that only one of the switches Q1 and Q2 is turned on at a time to avoid shorting VIN to GND. In some configurations or operating modes, such as continuous conduction mode (CCM) or the like, Q2 may remain on until the end of the cycle at which time it is turned off before Q1 is turned back on. If DCM (discontinuous conduction mode) is implemented, Q2 may be turned off before the end of a cycle so that both switches are off for a period of time.

In the illustrated embodiment, the electronic switches Q1 and Q2 are shown as FET or MOS type devices, such as a pair of N-channel metal-oxide semiconductor, field-effect transistors (MOSFETs) as known to those skilled in the art. Other types of electronic switching devices may be used including other types of FETs and the like, and other types of transistors, such as bipolar junction transistors (BJTs) or insulated-gate bipolar transistors (IGBTs) and the like, etc. Also, opposite conductivity types may be used, such as P-channel or P-type devices in any of the transistor categories.

The input voltage VIN is coupled to the drain of Q1, having its source coupled to a phase node 257. The phase node 257 is coupled to the drain of Q2 and to one end of an output inductor L1. The source of Q2 is coupled to AGND. The other end of the output inductor L1 is coupled to an output node 259 developing the output voltage VOUT. The output node 259 is further coupled to one end of an output capacitor CO, having its other end coupled to AGND. An output connection 261 is shown for coupling to the outputs of the other phase circuits, in which the outputs of the phase circuits are coupled together at node 259 to develop VOUT.

General operation of the first phase circuit 200 is now described. The current sources 209 and 219 ensure that a constant current flows through the window resistors 213 and 215 during operation. Although the window resistors 213 and 215 are each adjustable, they are adjusted at the same time by the same adjust resistor control value RW so that they have substantially equal resistances during operation. In this manner, the voltage level of VCOMP remains centered between the upper and lower window voltages VW+ and VW− regardless of the voltage level of VCOMP. In other words, both VW+ and VW− float with VCOMP as VCOMP changes, so that VW+−VCOMP=VCOMP−VW−. The overall window voltage between VW+ and VW− is adjusted by RW (by increasing or decreasing the resistances of the window resistors) to adjust the switching frequency FSW of PWM1 as further described herein.

When PWM1 is low (inactive), the switch 223 is open so that the current source 225 discharges the ripple capacitor 226 so that the voltage level of VR1 ramps down at generally a constant rate proportional to the output voltage (e.g., proportional to VDAC). It is noted that when PWM1 previously transitioned from high to low, the SRFF 233 is set pulling its output high closing the switch 235 so that the voltage of node 239 is pulled to the voltage level of VW+. In other words, while PWM1 is low, the capacitor 237 remains discharged and node 239 is clamped to VW+.

When VR1 falls below the voltage level of node 249, the output of the comparator 253 goes high which sets the SRFF 255 pulling PWM1 high. When PWM1 is high (active), Q1 is turned on (and Q2 turned off) so that VIN is coupled to the output inductor L1 via the phase node 257 during a power portion of the cycle. When PWM1 goes high, the switch 223 is closed so that the current source 221 charges the ripple capacitor 226. PWM1 going high also sets the SRFF 243 so that it pulls its Q output high to close the switch 245. The switch 245 is closed while PWM1 is high which discharges the capacitor 247 and clamps the voltage of node 249 to VW−.

It is noted that although the current source 225 continuously draws current I2 from the capacitor 226, the voltage of VIN is greater than VOUT (represented as VDAC) in a buck-type configuration, so that the current I1=gm·VIN is greater than I2=gm·VDAC. In this manner, the capacitor 226 is charged with a positive current of gm(VIN−VDAC) so that the voltage level of VR1 ramps up generally proportional to the difference between VIN and VOUT. When VR1 rises above VCOMP, the comparator 207 transitions the SLOPERESET signal from high to low. The SLOPERESET signal resets the SRFF 233 so that the switch 235 is opened. When the switch 235 is opened, the current source 241 discharges the capacitor 237 by the current I3, which is I3=gm(VIN−VDAC). The node 239 thus discharges at a proportional rate as the charging of the capacitor 226 since the same charge/discharge current is operative. If the capacitance of the capacitor 237 is the same as that of the capacitor 226, then they are charged and discharged, respectively, at substantially the same rate.

When the voltage level of VR1 (ramping up) exceeds the voltage level of node 239 (ramping down), then the RST comparator 252 asserts its output high to reset the SRFF 255 to pull PWM1 back low. PWM1 going low sets the SRFF 233 to close the switch 235 to discharge the capacitor 237 and re-clamp node 239 back to VW+. PWM1 going low also opens the switch 223 removing the current source 221 so that the ripple capacitor 226 is once again discharged at the rate gm·VDAC so that VR1 ramps back down. When VR1 falls below the voltage level of VCOMP, the output of the comparator 207 transitions SLOPERESET from low to high to reset the SRFF 243. The switch 245 is opened so that the capacitor 247 is charged by the current I4=gm·VDAC, so that the node 249 begins ramping up from VW−.

It is noted that VR1 is ramping down at a rate that is proportional to the rate at which node 249 is ramping up. If the capacitance CS of the capacitor 247 is equal to that of the ripple capacitor 226 (CR1), then the both ramp at substantially the same rate in the opposite direction towards each other. When the voltage of the node 249 (ramping up) exceeds the voltage VR1 (ramping down), then the comparator 253 asserts its output high to set the SRFF 255, which pulls PWM1 back high to initiate the next cycle. Operation repeats in this manner for successive cycles of PWM.

It is noted that the ripple voltage VR1 ramps up at a rate proportional to VIN−VOUT when PWM1 is high and ramps down at a rate proportional to the output voltage VOUT when PWM1 is low. When PWM1 is high, Q1 is turned on so that the voltage across the output inductor L1 is VIN−VOUT. When PWM1 is low, Q2 is turned on so that the voltage across the output inductor L1 is VOUT−GND, or just VOUT. In this manner, the regulator 103 is configured according to a synthetic ripple regulator which develops a ripple voltage indicative of ripple current through the output inductor L1 based on the input voltage and the output voltage. It is known that driving a capacitor with a current proportional to the voltage across the inductor provides a desirable synthetic ripple waveform shape. In other words, a synthetic ripple regulator generates an auxiliary voltage waveform (in this case, ripple voltage VR1) that effectively replicates the waveform ripple current through an output inductor, and uses the auxiliary voltage waveform to control toggling of a hysteretic comparator to control regulation of the output voltage.

As noted above, while VR1 ramps up when PWM1 is high, the ramp developed on node 239 by the capacitor 237 decreases from the voltage level of VW+ and is used to terminate the pulse on PWM1. Also, while VR1 ramps down when PWM1 is low, the ramp developed on node 249 by the capacitor 247 decreases from the voltage level of VW+ and is used to initiate the next pulse on PWM1. Since the ramp voltages ramp at a constant rate relative to either of the window voltages VW+ and VW−, the overall window voltage between VW+ and VW− may be used to adjust the switching frequency of PWM1. In particular, when the overall window voltage VW+−VW− is increased, the switching frequency FSW is decreased and when the overall window voltage VW+−VW− is decreased, FSW is increased. The resistor control value RW may thus be used to control FSW of the first phase circuit 200.

The regulator 103 is a variable frequency switcher in which the switching frequency FSW may vary depending upon transient load conditions. A frequency locked loop (FLL) block 267, however, is included for controlling the steady state switching frequency FSW by asserting RW to control the resistances of both of the resistors 213 and 215. A frequency set value FSET is received which has a value indicative of the target steady state frequency of FSW. In one embodiment, FSW may range between 2 gigahertz (GHz) and 6 GHz, although any suitable frequency range is contemplated. The FLL block 267 receives PWM1 and FSET and outputs RW (as a digital value RW<0:7>) to adjust the steady state FSW. An embodiment of one such scheme is described in U.S. Pat. No. 7,755,341 entitled "Steady State Frequency Control Of Variable Frequency Switching Regulators" issued Jul. 13, 2010, which is hereby incorporated by reference in its entirety.

Figure 6:
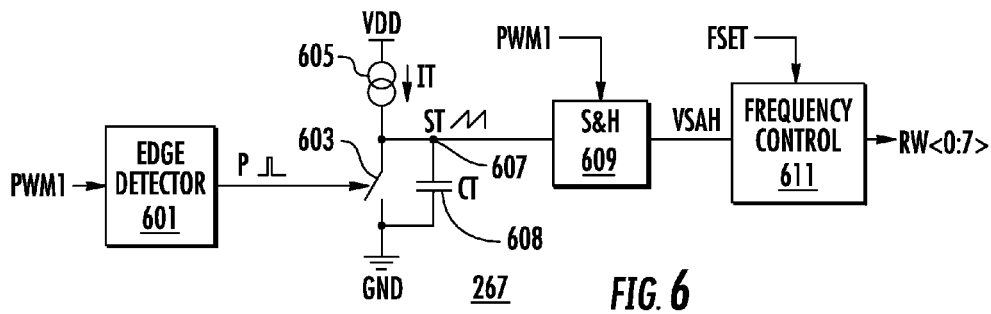
FIG. 6 is a simplified schematic and block diagram of the FLL block of FIG. 2 implemented according to one embodiment.

FIG. 6 is a simplified schematic and block diagram of the FLL block 267 implemented according to one embodiment. PWM1 is provided to an input of an edge detector 601 that senses rising (and/or falling) edges of PWM1 and provides corresponding pulses on a pulse signal P. The P signal is provided to the control input of a SPST switch 603, having a first switched terminal coupled to a node 607 and a second switched terminal coupled to GND. A current source 605 is coupled between VDD and node 607 and sources a fixed current IT to node 607. A capacitor 608 with a capacitance "CT" is coupled between node 607 and GND. Node 607 is provided to an input of a sample and hold (S&H) circuit 609, which also receives PWM1 and outputs a sample and hold signal VSAH. VSAH is provided to an input of a frequency control block 611, receiving FSET and providing the digital resistor control value RW<0:7>.

In operation, the edge detector 601 generates a series of pulses on signal P at a frequency indicative of the frequency of PWM1. The time between each pulse of P indicates an actual period of PWM1 on a cycle by cycle basis. Each pulse on P temporarily closes the switch 603 to discharge the capacitor 608. The switch 603 then opens and the current source 605 charges the capacitor 608 at a selected rate until the capacitor 608 is discharged by the next pulse on P, so that a sawtooth waveform ST develops on node 607. The selected rate of charge depends upon the values of IT and CT. The frequency of the sawtooth waveform ST indicates the frequency of PWM1, and the ramp duration of ST indicates the period of each cycle of PWM1. The S&H circuit 609 samples the ST signal at its input while PWM1 is at a first state, such as low, and then holds its sampled value as the VSAH signal when PWM1 transitions state, such as going from low to high. Thus, if P is pulsed when PWM1 goes high, then ST is at its peak value when the S&H circuit 609 triggers to hold VSAH at the peak value of ST. In this manner, VSAH is the peak voltage of ST from cycle to cycle. Since the values of IT and CT are known, the peak voltage level of ST reflected by the voltage level of VSAH reflects the frequency and period of PWM1.

In this manner, the edge detector 601, the switch 603, the current source 605, the capacitor 608 and the S&H circuit 609 collectively form a timing circuit or frequency detector for measuring the period and/or frequency of PWM1 and providing VSAH as a "period voltage" having a voltage level indicative of the period of PWM1 on a cycle by cycle basis.

VSAH and FSET are provided to respective inputs of a frequency control block 611 having an output providing RW<0:7>. FSET is used to provide a target voltage level indicative of the target steady-state switching frequency. In general, the frequency control block 611 compares FSET and VSAH using a comparator circuit or the like to develop a frequency error signal (voltage or current or other signal type), which is converted to RW (shown as RW<0:7>). RW is thus used to adjust the frequency of PWM1 to the frequency level indicated by FSET according to FLL operation. Further details of the frequency control block 611 are not provided. Nonetheless, the prior U.S. Pat. No. 7,755,341 illustrates the concepts of steady state frequency control using FLL concepts. In this manner, the FLL block 267 develops VSAH having a voltage level indicative of the actual frequency (and thus the period) of PWM1 and further provides the resistor control value RW to control the steady state operating frequency.

It is noted that the regulator 103 has a variable frequency in that the actual operating frequency may increase in response to a load transient increase (relatively fast increase of the load level) or may decrease in response to a load transient decrease (relatively fast decrease of the load level). The actual frequency then drifts back to the steady state frequency as controlled by the FLL block 267.

Referring back to FIG. 2, a phaser circuit 269 is used to set the timing of the other phase circuits based on the timing of phase 1, where "N" is any suitable integer of two or more. Any number of phases of two or more are contemplated. The phaser circuit 269 receives SLOPERESET and VSAH and provides N high side trigger signals HSR<1:N> and a corresponding N low side trigger signals LSR<1:N>. Each low side trigger signal is used to initiate a low side ramp voltage in a corresponding phase circuit. The low side ramp voltage is compared to a corresponding ripple voltage within the corresponding phase circuit to determine when to initiate a corresponding PWM signal (or pulse control signal) for that phase. Similarly, each high side trigger signal is used to initiate a high side ramp voltage in a corresponding phase circuit. The high side ramp voltage is compared to the corresponding ripple control voltage within the corresponding phase circuit to determine when to terminate the corresponding PWM signal for that phase.

The high and low side trigger signals HSR<1> and LSR<1> for the first phase circuit 200 are based on comparing VCOMP with the corresponding ripple voltage VR1 in the first phase circuit 200. The comparator 207 performs this comparison to generate transitions of the SLOPERESET signal. When VR1 rises to VCOMP, SLOPERESET transitions low and the phase block 269 asserts a trigger pulse on HSR<1> to reset the SRFF 233. This initiates the high side ramp voltage on node 239 which ramps down from the upper window voltage VW+. When VR1 rises to intersect the high side ramp voltage on node 239, the comparator 252 transitions to reset the SRFF 255 to reset PWM1 low, so that VR1 begins ramping back down.

When VR1 falls to VCOMP, the comparator 207 transitions SLOPERESET high and the phase block 269 asserts a trigger pulse on LSR<1> to reset the SRFF 243. This initiates the low side ramp voltage on node 249 which ramps up from the lower window voltage VW−. When VR1 falls to intersect the low side ramp voltage on node 249, the comparator 253 transitions to set the SRFF 255 to set PWM1 back high, so that VR1 begins ramping back up again. Operation repeats in this manner.

The high and low side trigger signals HSR<2:N> and LSR<2:N> for the other phase circuits are based on assertion of HSR<1> and LSR<1>, the period of PWM1 and the number of phases N. As further described herein, the phaser circuit 269 initiates a phaser ramp in response to HSR<1>, and when the phaser ramp reaches a phaser threshold PTH based on the period of PWM1 and the number of phases N, it pulses HSR<2> to trigger the high side ramp for the second phase. The phaser circuit 269 repeats this process to trigger the high side ramp for any subsequent phases. Furthermore, the phaser circuit 269 initiates a phaser ramp in response to LSR<1>, and when the phaser ramp reaches the phaser threshold PTH based on the period of PWM1 and the number of phases N, it pulses LSR<2> to trigger the low side ramp for the second phase. The phaser circuit 269 repeats this process to trigger the low side ramp for any subsequent phases.

For example, HSR<2> and LSR<2> are the high and low side trigger signals, respectively, for the second phase 2, HSR<3> and LSR<3> are the high and low side trigger signals, respectively, for the third phase 3 (if any), and so on. The timing of each of the subsequent HSR and LSR trigger pulses for the additional phases are based on the timing of the HSR<1> and LSR<1> trigger pulses of the first phase and an iteration of a phase delay between the phases. The phase delay is the period of PWM1 divided by the number of phases, so that the timing of the phases are separated from each other by the phase delay. Each HSR trigger pulse is used to reset a high side SRFF (corresponding with high side SRFF 233 of the first phase) in a corresponding phase circuit and each LSR trigger pulse is used to reset a low side SRFF (corresponding with low side SRFF 243 of the first phase) in a corresponding phase circuit.

It is noted that the HSR<1> and LSR<1> trigger signals may not be necessary for use in the first phase 1 since SLOPERESET may be used to perform the same function for phase 1. For example, SLOPERESET may be provided to the reset input of the SRFF 243 instead of HSR<1>, and SLOPERESET may be inverted and provided to the reset input of the SRFF 233 instead of LSR<1>. If not used, then the phaser circuit 269 may be simplified to only generate HSR<2:N> and LSR<2:N> trigger signals without generating or providing HSR<1> or LSR<1>. Operation of the phaser circuit 269 is described more fully below.

Figure 3:
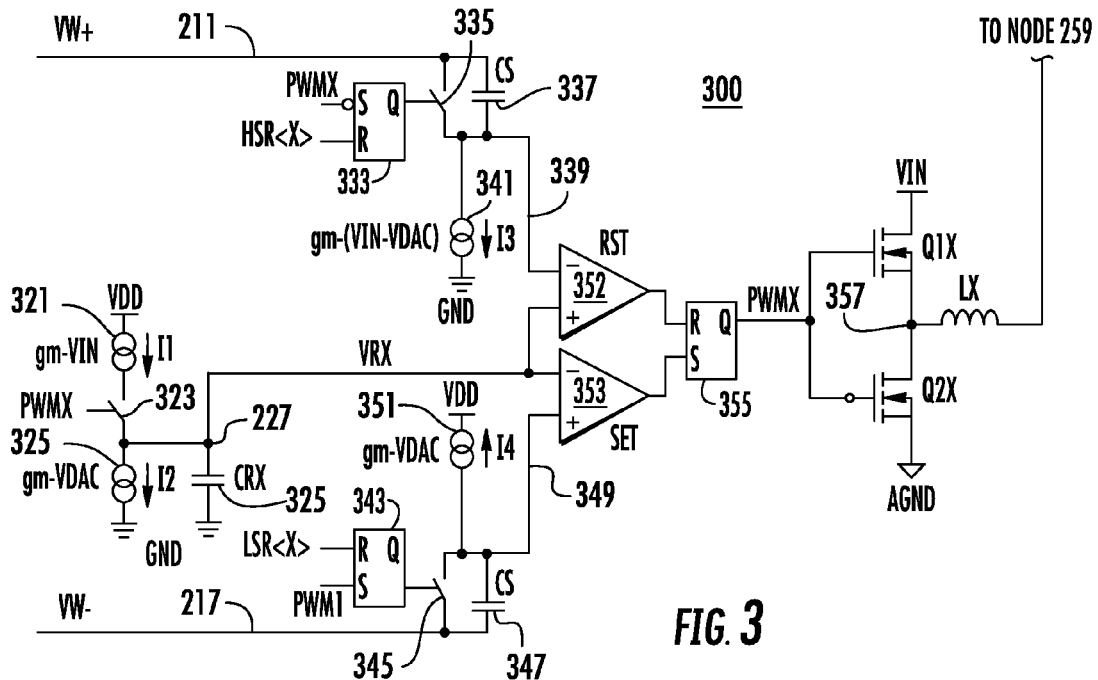
FIG. 3 is a simplified schematic and block diagram representing each additional phase circuit of the regulator of FIG. 1 according to one embodiment.

FIG. 3 is a simplified schematic and block diagram representing each additional phase circuit 300 of the regulator 103 according to one embodiment. The number "N" denotes the total number of phases, and a value "X" is an integer index value that ranges from 2 to N denoting each of the additional phases other than the first phase 1. Thus, the value "X" is used in FIG. 3 to illustrate phase X, which is any one of the additional phases 2–N other than the first phase. For example, the phase circuit 300 develops a PWM signal PWMX, which denotes PWM2 for the second phase, PWM3 for the third phase (if any), and so on. The phase circuit 300 is implemented in similar manner as corresponding portions of the phase circuit 200.

The phase circuit 300 includes current sources 321 and 325, a switch 323 and a ripple capacitor 326 with capacitance "CRX" which are coupled in a similar manner as the current sources 221 and 225, the switch 223 and the ripple capacitor 226, respectively, of the phase circuit 200, to develop a ripple voltage VRX on a ripple node 327 in a similar manner as the ripple voltage VR1 on the ripple node 227. The current sources 321 and 325 develop currents I1=gm·VIN and I2=gm·VDAC, respectively, in a similar manner as previously described for developing increasing and decreasing ramp voltage on the ripple node 327. The current sources 321 and 325, the switch 323 and the capacitor 326 collectively form a voltage generator for developing a ripple voltage VRX on the ripple node 327 for phase X. VRX is a ramp control signal that ramps up when PWMX is active and that ramps down when PWMX is inactive for phase X. The ripple node 327 of phase X is coupled to the negative input of a SET comparator 353, which is coupled to operate in similar manner as the SET comparator 253. The ripple node 327 is further coupled to the positive input of a RST comparator 352, which is coupled to operate in a similar manner as the RST comparator 252.

The phase circuit 300 includes SRFF 333, switch 335, capacitor 337, and current source 341 which are coupled in a similar manner as the SRFF 233, switch 235, capacitor 237, and current source 241, respectively, of the phase circuit 200, to form a high side ramp generator that develops a high side ramp on a node 339 in a similar manner as the high side ramp developed on the node 239. The capacitor 337 and switch 335 are coupled between node 211 (developing the voltage VW+) and node 339 in similar manner. Node 339 is coupled to the negative input of the RST comparator 352. The current source 341 develops the current I3=gm(VIN−VDAC) in similar manner as the current source 241. The SRFF 333 has an inverted set input receiving PWMX and a reset input receiving HSR<X> for phase X.

The phase circuit 300 includes SRFF 343, switch 345, capacitor 347, and current source 351 which are coupled in a similar manner as the SRFF 233, switch 235, capacitor 237, and current source 251, respectively, of the phase circuit 200, to form a low side ramp generator that develops a low side ramp on a node 349 in a similar manner as the low side ramp developed on the node 249. The capacitor 347 and switch 345 are coupled between node 217 (developing the voltage VW−) and node 349 in similar manner. Node 349 is coupled to the positive input of a SET comparator 353, which is coupled to operate in similar manner as the SET comparator 253. The current source 351 develops the current I4=gm·VDAC in similar manner as the current source 251. The SRFF 343 has a set input receiving PWMX and a reset input receiving LSR<X> for phase X.

The output of the RST comparator 352 is coupled to the reset input of an SRFF 355, and the output of the SET comparator 353 is coupled to the set input of SRFF 355. The Q output of the SRFF 344 asserts the PWMX signal for phase X, which is shown provided to the gate of a first electronic switch Q1X. The PWMX signal is also shown inverted (inverting bubble) and then provided to the gate of a second electronic switch Q2X. Operation is substantially similar to that described for phase 1. Q1X and Q2X are coupled between the input voltage VIN and GND in similar manner with an intermediate phase node 357 coupled to one end of an output inductor LX for phase X. The other end of LX is coupled to node 259 (VOUT) via connection 261 or the like.

Operation of each phase circuit 300 is similar to that described for phase 1, except that the timing is dictated by the high and low side trigger signals HSR<X> and LSR<X> for phase X as a corresponding pair of the HSR<2:N> and LSR<2:N> trigger signals provided by the phaser circuit 269. The ripple voltage VRX, the ramp signals developed on nodes 339 and 349, and the PWMX signals are each similar to the corresponding ripple, ramp and PWM1 signals of the first phase, except shifted in time as controlled by the phaser circuit 269.

Figure 4:
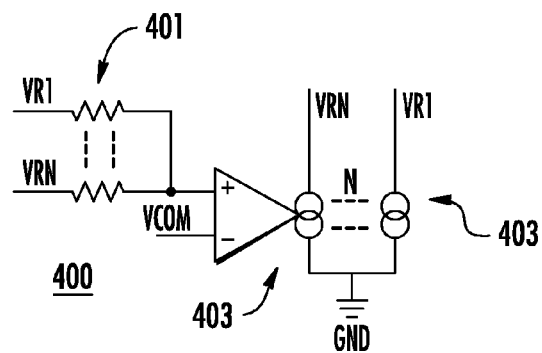
FIG. 4 is a schematic diagram of an AC current balance circuit for the regulator of FIG. 1 implemented with a number N phases (1, . . . , N) according to one embodiment.

FIG. 4 is a schematic diagram of an AC current balance circuit for the regulator 103 implemented with N phases (1, . . . , N) according to one embodiment. Each ripple voltage is provided to a corresponding one of an array of N balance resistors 401, each coupled to a positive input of each of an array of N current balance transconductance amplifiers 403. Each transconductance amplifier 403 receives a common voltage level VCOM at its negative input. The output of each of the N current balance transconductance amplifiers 403 generates a corresponding current which is applied to a corresponding one of the N ripple voltage nodes (developing ripple voltages VR1, . . . VRN) of the phase circuits.

Figure 5:
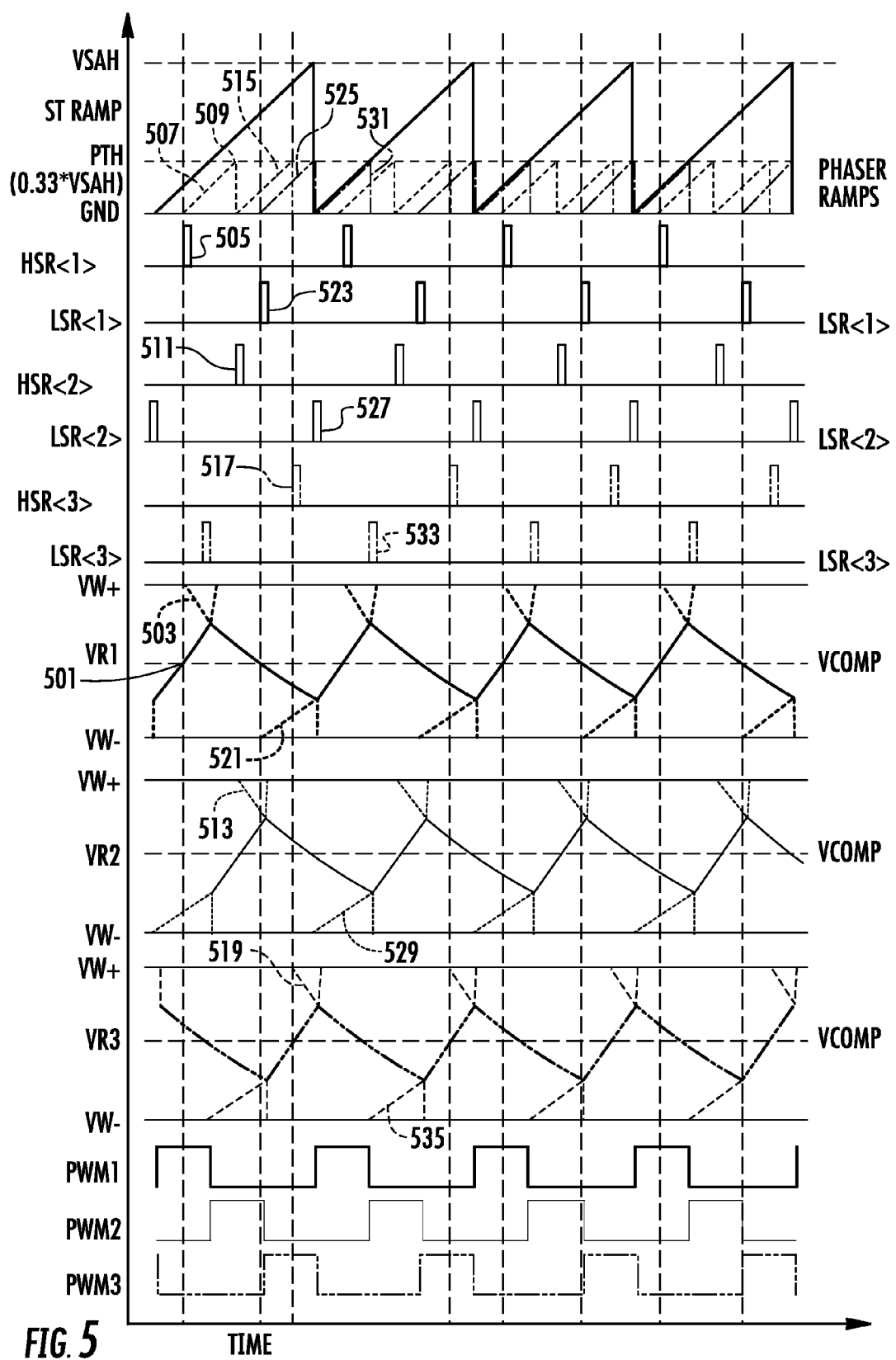
FIG. 5 is a timing diagram illustrating operation of the regulator of FIG. 1 according to one embodiment including three (3) phases (N=3)

FIG. 5 is a timing diagram illustrating operation of the regulator 103 according to one embodiment including three (3) phases (N=3). The timing diagram plots the ST ramp superimposed with VSAH, the phaser ramp threshold PTH, phaser ramps, the high and low side ramp signals HSR<1>, LSR<1>, HSR<2>, LSR<2>, HSR<3> and LSR<3>, the ripple voltages VR1, VR2 and VR3 each superimposed with VCOMP between VW+ and VW−, and the PWM1-PWM3 signals versus time for the three phase circuits. The ST ramp is shown as a sawtooth waveform that starts from a low level (e.g., GND) upon assertion of PWM1 and ramps up at a predetermined rate and then resets back low when PWM1 is asserted again for the next cycle. As previously described, the peak voltage level of the ST ramp is sampled and held for each cycle to provide the VSAH voltage, which represents the period of PWM1. Thus, VSAH is indicative of the period of each cycle of PWM1. As previously described, the FLL block 267 operates to maintain the steady state switching frequency of PWM1 at a frequency indicated by FSET. Although the steady state frequency of PWM1 may be locked to a predetermined frequency, the actual frequency may change from cycle to cycle in response to load transients as previously described.

VCOMP is illustrated in simplified format with each of VR1-VR3 as a horizontal plot over time. VW+ and VW− are also shown in simplified format at a relatively constant voltage above and below, respectively, the voltage level of VCOMP. It is noted, however, that VCOMP varies with load conditions and varies during normal operation, so that VW+ and VW− also vary essentially tracking above and below VCOMP. Furthermore, when the FLL block 267 adjusts RW to adjust the switching frequency FSW, then the voltage differences VW+−VCOMP and VCOMP−VW− adjust accordingly by the same amount thereby increasing or decreasing VW+−VW−. Nonetheless, regardless of changes of VCOMP and RW, VCOMP remains centered between VW+ and VW−.

In the first illustrated cycle, when PMW1 goes high, the VR1 voltage of the first phase ramps up as previously described. When VR1 reaches (or exceeds) VCOMP as shown at 501, the SLOPERESET signal transitions low initiating a first high side ramp 503 for the first phase on node 239, which ramps down from VW+. This event is illustrated by the phaser circuit 269 generating a first high side trigger pulse 505 on HSR<1>.

In response to the first HSR<1> trigger pulse 505, the phaser circuit 269 initiates a first phaser ramp 507. By design, each phaser ramp has substantially the same slope or rate of change as the ST ramp for each cycle. The phaser circuit 269 internally develops a phaser ramp (PTH) threshold PTH which is calculated as the voltage level of VSAH divided by the number of phases N, or PTH=VSAH/N. For N=3, PTH=VSAH/3≈0.33VSAH. Thus, the PTH threshold represents 1/Nth (e.g., $\frac{1}{3}^{rd}$ for 3 phases) of the period of the PWM1 signal, so that the timing of each of the other phases is referenced to the timing of the first phase. Thus, PTH represents the phase delay between the phases of the regulator 103.

When the first phaser ramp 507 reaches the PTH threshold as shown at 509, the first phaser ramp 507 is reset back low and the phaser circuit 269 generates a first trigger pulse 511 on HSR<2>. As shown by the phase circuit 300, for the second phase (X=2), the HSR<2> trigger pulse 511 resets the SRFF 333 opening the switch 335 for phase 2. The current source 341 then discharges the capacitor 337 for the high side ramp for phase 2. FIG. 5 shows a first high side ramp 513 initiated by the HSR<2> trigger pulse 511 for the second phase.

VR2 increases while PWM2 for phase 2 is asserted high, and the high side ramp 513 ramps down at about the same rate. When VR2 rises to intersect the high side ramp 513, PWM2 is asserted low so that VR2 reverses and ramps down based on gm·VDAC in similar manner as phase 1.

It is appreciated that the timing of the HSR<2> trigger pulse 511 for phase 2 is not based on the ripple voltage VR2 of phase 2 crossing VCOMP as is the case for phase 1. As noted above, the HSR<1> trigger pulse 505 of phase 1 is initiated when VR1 crosses VCOMP. Instead, for phase 2, the timing of the HSR<2> trigger pulse 511 is relative to the timing of phase 1. In particular, the HSR<2> trigger pulse 511 occurs when the phaser ramp 507 reaches the PTH threshold as shown at 509, so that the phaser ramp 507 was initiated in response to the HSR<1> trigger pulse 505 of phase 1. The PTH threshold is determined directly from VSAH, which represents the switching period of PWM1. Further, the slope of the phaser ramp 507 is substantially equal to the slope of the ST ramp. In this manner, the HSR<2> trigger pulse 511 for phase 2 is initiated after $\frac{1}{3}^{rd}$ the period of PWM1 after the HSR<1> trigger pulse 505. Thus, the timing of events of phase 2 and any other the additional phases are based on the timing of corresponding events of the first phase 1.

Just after the first phaser ramp 507 is reset back low, the phaser circuit 269 immediately initiates a second phaser ramp 515 substantially the same as the first phaser ramp 507 with substantially the same timing. When the second phaser ramp 515 reaches the PTH threshold, the phaser circuit 269 resets it back low and asserts a first trigger pulse 517 on HSR<3> for phase 3. The phase circuit 300 for phase 3 (X=3) responds by initiating a corresponding first high side ramp 519. In a similar manner as previously described for the first two phases, the high side ramp 519 ramps down at about the same rate that the ripple voltage VR3 ramps up for the third phase 3. When VR3 intersects the high side ramp 519, PWM3 is asserted low and VR3 begins ramping back down.

The timing of the low side pulses of the additional phases (e.g., phases 2 and 3) are also based on the timing of phase 1 in similar manner. As previously described, when VR1 intersects the high side ramp 503 for the first phase 1, PWM1 is asserted low and the ripple voltage VR1 ramps down. When VR1 falls to VCOMP, SLOPERESET is asserted back high causing the phaser circuit 269 to assert a first low side trigger pulse 523 on LSR<1> to reset the SRFF 243. When SRFF 243 is reset, a first low side ramp 521 is initiated. The low side ramp 521 rises as the same rate that VR1 is falling, and when they intersect, PWM1 is asserted high again to initiate the next cycle as previously described.

Meanwhile, when the first low side trigger pulse 523 on LSR<1> is asserted, the phaser circuit 269 initiates another phaser ramp 525. The phaser ramp 525 is substantially similar to the phaser ramp 507 in that it ramps from GND to the PTH threshold at about the same rate as the ST ramp. When the phaser ramp 525 reaches PTH, the phaser circuit 269 asserts a first trigger pulse 527 on LSR<2> for the second phase. In response to the LSR<2> trigger pulse 527, the SRFF 343 of phase 2 is reset opening switch 345 to initiate a corresponding low side ramp 529 for the second phase 2. The low side ramp 529 rises at about the same rate that the ripple voltage VR2 falls and when they intersect, the comparator 353 sets the SRFF 355 to assert PWM2 back high to initiate the next cycle for phase 2. PMW2 going high causes VR2 to begin ramping up again and operation repeats in this manner for phase 2.

Meanwhile, when the phaser ramp 525 resets back low, the phaser circuit 269 immediately initiates another phaser ramp 531. When the phaser ramp 531 reaches the PTH threshold, the phaser circuit 269 asserts a trigger pulse 533 on LSR<3> for the third phase. In response to the LSR<3> trigger pulse 533, the SRFF 343 of phase 3 is reset opening switch 345 to initiate a corresponding low side ramp 535 for the third phase 3. The low side ramp 535 rises at about the same rate that the ripple voltage VR3 falls and when they intersect, the comparator 353 sets the SRFF 355 to assert PWM3 back high to initiate the next cycle for phase 3. PMW3 going high causes VR3 to begin ramping up again and operation repeats in this manner for phase 3.

Figure 7:
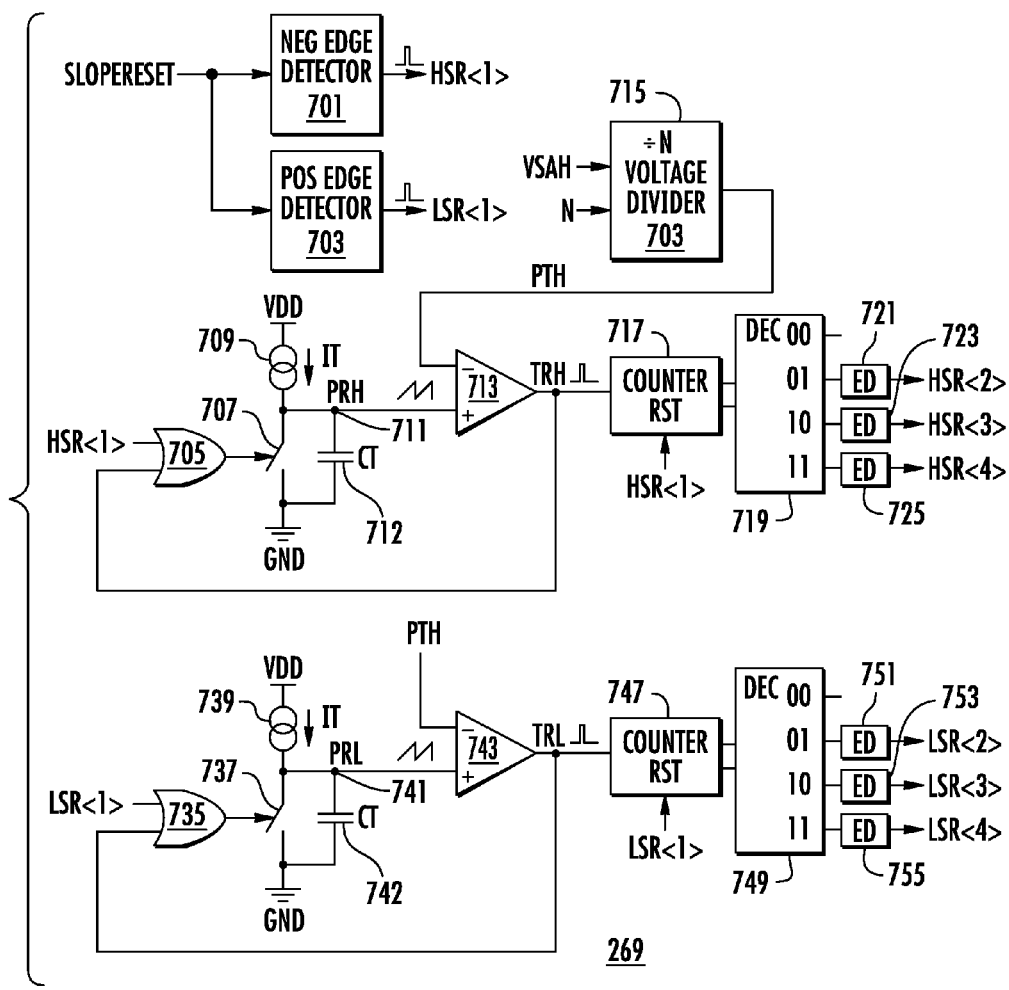
FIG. 7 is a simplified schematic and block diagram of the phaser block of FIG. 2 implemented according to one embodiment for developing the HSR and LSR trigger pulses for each phase circuit for up to four phases.

FIG. 7 is a simplified schematic and block diagram of the phaser circuit 269 implemented according to one embodiment. The SLOPERESET signal is provided to respect inputs of a negative edge detector 701 and a positive edge detector 703. The negative edge detector 701 outputs HSR<1> and the positive edge detector 703 outputs LSR<1>. Each of the edge detectors 701 and 703 outputs a pulse when the edge condition occurs on its input. Thus, when SLOPERESET transitions from high to low (negative edge), the negative edge detector 701 asserts a trigger pulse on HSR<1>, and when SLOPERESET transitions from low to high (positive edge), the positive edge detector 703 asserts a trigger pulse on LSR<1>. VSAH and N (number of phases) are provided to an input of a divide-by-N(÷N) voltage divider 715, which outputs the phaser ramp threshold PTH=VSAH/N.

HSR<1> is provided to one input of a 2-input OR gate 705, having an output provided to the control input of a SPST switch 707, having a first switched terminal coupled to a node 711 and a second switched terminal coupled to GND. A current source 709 is coupled between VDD and node 711 and sources the fixed current IT to node 711. A capacitor 712 with the capacitance "CT" is coupled between node 711 and GND. Node 711 develops phaser ramps PRH for the HSR trigger signals as further described herein. Node 711 is provided to the positive input of a comparator 713, which receives PTH at its negative input. The output of the comparator 713 develops a trigger reset signal TRH, which is fed back to the other input of the OR gate 705 and further provided to the input of a 2-bit binary (or digital) counter 717. Although the counter 717 is shown with 2 bits for handling up to four phases (e.g., N≤4), the counter 717 may have additional bits for controlling a greater number of phases. The counter 717 includes a reset input (RST) receiving HSR<1>.

The 2-bit output of the counter 717 is provided to respective inputs of a decoder 719, which provides four decoded digital values at its output. For example, output "00" is asserted high in response to binary 00b output form the counter 717, output "01" is asserted high in response to binary 01b output form the counter 717, etc. The "00" output is not used. The "01," "10," and "11" outputs of the decoder 719 are provided to edge detectors 721, 723 and 725, respectively. Each of the edge detectors 721, 723 and 725 pulses its output high in response to a rising edge at its input. The edge detectors 721, 723 and 725 provide trigger signals HSR<2>, HSR<3> and HSR<4>, respectively. The counter 717 and decoder 719 are shown for supporting up to four phases, but may be modified to support any number of phases with additional bits.

The LSR portion is configured in similar manner, including an OR gate 735, a switch 737, a current source 739 (current "IT"), a capacitor 742 (with capacitance "CT"), a comparator 743, a counter 747, a decoder 749, and edge detectors 751, 753 and 755 coupled to operate in similar manner as the OR gate 705, the switch 707, the current source 709, the capacitor 712, the comparator 713, the counter 717, the decoder 719, and edge detectors 721, 723 and 725. LSR<1> is provided to one input of the OR gate 735, receiving a trigger reset signal TRL at its other input and having its output coupled to the control input of the switch 737. The current source 739 provides current to a node 741 developing a pulse ramp signal PRL for the LSR portion. The comparator 743 compares PTH with PRL and provides the trigger reset signal TRL provided to the counter 747. The counter 747 has a reset input receiving LSR<1>, and has its outputs coupled to corresponding inputs of the decoder 749. The "01," "10," and "11" outputs of the decoder 749 are coupled to inputs of the edge detectors 751, 753 and 755, respectively, providing the trigger signals LSR<2>, LSR<3> and LSR<4>, respectively.

In operation of the phaser circuit 269, the HSR<1> and LSR<1> trigger signals are developed with SLOPERESET using the edge detectors 701 and 703, respectively. The voltage level of VSAH is divided by the applicable number of phases to provide the phaser threshold PTH for the phaser ramps PRH and PRL for each phase. When HSR<1> is pulsed, the OR gate 705 temporarily closes switch 707 to discharge the capacitor 712 and pull the phaser ramp PRH to GND. The comparator 713 pulls TRH low, and the counter 717 is reset to "00."

When the switch 707 re-opens, the current source 709 charges the capacitor 712 with current IT so that PRH ramps up at the selected rate. When PRH rises above PTH, TRH is asserted high to increment the counter 717 to "01." TRH going high also causes the OR gate 705 to pull its output high to close the switch 707 and discharge the capacitor 712 to pull PRH back low. The comparator 713 thus pulls TRH back low, and switch 707 is re-opened to initiate the next PRH ramp. In this manner, whenever TRH goes high, it is reset back low so that it pulses high to initiate each new PRH ramp for each additional phase.

When the counter 717 increments, it asserts its output "01" high so that the edge detector 721 pulses HSR<2> high to initiate the high side ramp for the second phase. If there are at least 3 phases, then the next pulse of TRH increments the counter 717 again to "10," so that the edge detector 723 pulses HSR<3> for phase 3. If there are 4 phases, then the next pulse of TRH increments the counter 717 again to "11," so that the edge detector 725 pulses HSR<4> for phase 4, and so on. After the last phase is triggered, HSR<1> is pulsed high to reset the counter 717 back to "00" and operation repeats in round-robin fashion.

The circuitry for developing the LSR trigger pulses is configured to operate in substantially the same manner, in which the LSR<1>, PRL, TRL, LSR<2>, LSR<3> and LSR<4> signals replace the corresponding signals HSR<1>, PRH, TRH, HSR<2>, HSR<3> and HSR<4>.

It is noted that the HSR and LSR portions both develop phaser ramp signals using current IT and capacitance CT in similar manner as for the ramp generator within the FLL block 267 developing the ST ramp. Although the current and capacitance values may be varied, it is desired that the ramps have about the same rate of change so that each phaser ramp terminates after 1/Nth the time of the ST ramp corresponding to PTH being 1/Nth the voltage of VSAH. In this manner, each phaser ramp has 1/Nth the period of the ST ramp and each phaser ramp represents a phase delay for each of the N phases of the regulator 103.

In summary, the steady state frequency of the first phase 1 is controlled by the FLL block 267 based on the FSET value. In the illustrated embodiment, the frequency is controlled by adjusting window resistors of a window circuit above and below VCOMP for adjusting switching thresholds, although alternative methods may be employed. The first phase generates a ripple control voltage which ramps up or down depending upon the state of PWM1. When VR1 crosses VCOMP, corresponding trigger signals initiating phaser ramps that are generated to control the switching timing thresholds for transitioning PWM1. The FLL block 267 further measures the actual period of PWM1 and asserts VSAH indicative thereof to the phaser circuit 269.

The phaser circuit 269 uses SLOPERESET and VSAH and provides high and low side ramp pulses to determine the timing for the additional phase circuit(s) relative to the timing of phase 1 and based on the number (N) of phases. The phaser circuit 269 uses VSAH and N to establish a phase timing threshold (e.g., PTH), and initiates phaser ramps to dictate timing of the additional phase circuits. Each set of high and low phaser ramps initiated by the phaser circuit 269 are initiated in response to corresponding high and low trigger signals of the first phase, and each phaser ramp establishes a delay period (based on the measured period of phase 1) that is used to initiate the high and low side ramps of each additional phase circuits. Each phaser ramp establishes a phase delay as 1/N of measured period of the first phase, and corresponding switching events of each subsequent phase occur after a corresponding number of phase delays. For example, for each subsequent phase, the high and low side ramps for establishing switching thresholds of the second phase occur after a first phase delay, the high and low side ramps for establishing switching thresholds of the third phase (if any) occur after a second phase delay, and so on. In this manner, the phasing of the additional phase circuits are based on the timing of corresponding signals of the first phase 1.

A method capable of injection locking the phases of a peak-valley multiphase regulator includes comparing an output voltage error signal with a ramp control signal and providing a corresponding slope reset signal, using transitions of the slope reset signal to develop equally spaced high side ramp signal and equally spaced low side ramp signals, and injecting a corresponding one of the high side signals and a corresponding one of the low side ramp signals into each of the phases which correspondingly develop equally spaced pulse control signals for multiphase operation. The method may include measuring switching frequency of one of the phases, comparing the measured frequency with a predetermined frequency level to provide a frequency adjust value, and using the frequency adjust value to control steady state switching frequency of each of the phases.

An injection locked phasing circuit for a peak-valley multiphase regulator has been described. The injection locked phasing circuit includes a comparator circuit, a phaser circuit, high side ramp generators and low side ramp generators. The comparator circuit compares an output voltage error signal with a ramp control signal and provides a corresponding slope reset signal. The phaser circuit senses transitions of the slope reset signal to provide equally spaced high side timing signals and equally spaced low side timing signals. Each high side ramp generator injects a high side ramp signal into a corresponding one of the phases based on a corresponding high side timing signal. Each low side ramp generator injects a low side ramp signal into a corresponding one of the phases based on a corresponding low side timing signal. The injection locked phasing circuit may include a frequency control circuit that compares a switching frequency of one of the phases with a predetermined frequency set value and adjusts steady state switching frequency of each phase based on the predetermined frequency set value.

An electronic device according to one embodiment includes a multiphase regulator, a comparator, a phaser circuit and multiple high side and low side ramp generators. The multiphase regulator includes multiple hysteretic PWM modulators, each generating a corresponding ramp control signal for transitioning a corresponding pulse control signals. The comparator compares an output voltage error signal with one of the ramp control signals and provides a corresponding slope reset signal. The phaser circuit detects transitions of the slope reset signal to provide equally spaced high side trigger signals and equally spaced low side trigger signals. Each high side ramp generator injects of a high side signal into a corresponding hysteretic PWM modulator based on a corresponding high side trigger signals. Each low side ramp generator injects a low side ramp signal into a corresponding hysteretic PWM modulator based on a corresponding low side trigger signal.

The benefits, features, and advantages of the present invention have become better understood with regard to the foregoing description and accompanying drawings. The description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. A method capable of injection locking the phases of a peak-valley multiphase regulator having a plurality of phases, comprising:
   generating a plurality of ramp control signals for the plurality of phases, wherein for each of the plurality of phases, a corresponding one of the plurality of ramp control signals ramps in a first direction when a corresponding one of a plurality of pulse control signals is active and ramps in a second direction when the corresponding pulse control signal is inactive;
   comparing an output voltage error signal with a first one of the plurality of ramp control signals and providing a corresponding slope reset signal;
   periodically measuring a period of a first one of said plurality of pulse control signals and determining a phase delay by dividing each measured period by a number of phases;
   using transitions of the slope reset signal to develop a plurality of high side timing signals that are spaced apart by the phase delay and to develop a plurality of low side timing signals that are spaced apart by the phase delay; and
   injecting a corresponding one of the high side timing signals and a corresponding one of the plurality of low side timing signals into each of the plurality of phases which correspondingly develop the plurality of pulse control signals for multiphase operation.

2. The method of claim 1, further comprising:
   comparing the measured period with a predetermined frequency set value to provide a frequency adjust value; and
   using the frequency adjust value to control steady state switching frequency of each of the plurality of phases.

3. The method of claim 1, wherein:
   said comparing and using comprises:
      detecting the first ramp control signal of a first phase crossing the output voltage error signal while the first pulse control signal is active and providing a first high side trigger signal; and
      detecting the first ramp control signal of the first phase crossing the output voltage error signal while the first pulse control signal is inactive and providing a first low side trigger signal; and
   wherein said injecting comprises using the first ramp control signal, the first high side trigger signal and the first low side trigger signal to determine timing of transitions of the first pulse control signal for the first phase.

4. The method of claim 3, wherein:

for each additional phase, said using comprises:
  providing an additional high side trigger signal after at least one iteration of the phase delay after the first high side trigger signal is provided; and
  providing an additional low side trigger signal after at least one iteration of the phase delay after the first low side trigger signal is provided; and
wherein for each additional phase, said injecting comprises using the additional high side trigger signal, the additional low side trigger signal and an additional ramp control signal to determine timing of transitions of an additional pulse control signal.

5. The method of claim 4, wherein for each of the plurality of phases including the first phase, said injection comprises:
  initiating a corresponding one of a plurality of high side ramps in response to a corresponding one of a plurality of high side trigger signals, wherein said corresponding high side ramp ramps in the second direction at the first rate;
  initiating a corresponding one of a plurality of low side ramps in response to a corresponding one of a plurality of low side trigger signals, wherein said corresponding low side ramp ramps in the first direction at the second rate; and
  transitioning the corresponding pulse control signal from active to inactive when the corresponding ramp control signal intersects the corresponding high side ramp signal, and transitioning the corresponding pulse control signal from inactive to active when the corresponding ramp control signal intersects the corresponding low side ramp signal.

6. The method of claim 4, wherein:

said providing an additional high side trigger signal comprises providing a second high side trigger signal after one iteration of the phase delay after the first high side trigger signal is provided;
wherein said providing an additional low side trigger signal comprises providing a second low side trigger signal after one iteration of the phase delay after the first low side trigger signal is provided; and
wherein said using the additional high side trigger signal, the additional low side trigger signal and an additional ramp control signal to determine timing of transitions of an additional pulse control signal comprises:
  using the second high side trigger signal and a second ramp control signal to determine timing of transition of a second pulse control signal from active to inactive; and
  using the second low side trigger signal and the second ramp control signal to determine timing of transition of the second pulse control signal from inactive to active.

7. The method of claim 4, wherein:

said periodically measuring a period of the first pulse control signal comprises:
  initiating a timing ramp voltage that ramps at a selected rate in response to a transition of the first pulse control signal; and
  determining a voltage of the timing ramp voltage as a period voltage after one cycle of the first pulse control signal; and
wherein said determining a phase delay comprises dividing the period voltage by the number of phases to provide a phaser threshold voltage.

8. The method of claim 7, wherein:

said providing an additional high side trigger signal comprises:
  initiating a first high side phaser ramp voltage that ramps at the selected rate in response to the first high side trigger signal; and
  providing a second high side trigger signal for a second phase when the first high side phaser ramp voltage reaches the phaser threshold voltage; and
wherein said providing an additional low side trigger signal comprises:
  initiating a first low side phaser ramp voltage that ramps at the selected rate in response to the first low side trigger signal; and
  providing a second low side trigger signal for the second phase when the first low side phaser ramp voltage reaches the phaser threshold voltage.

9. The method of claim 8, wherein said using the additional high side trigger signal, the additional low side trigger signal and an additional ramp control signal to determine timing of transitions of an additional pulse control signal comprises using the second high side trigger signal, the second low side trigger signal and a second ramp control signal to determine timing of transitions of a second pulse control signal for the second phase.

10. An injection locked phasing circuit for a peak-valley multiphase regulator, wherein the multiphase regulator has a plurality of phases including a first phase and at least one additional phase, said injection locked phasing circuit comprising:

a plurality of control generators that generate a plurality of ramp control signals for said plurality of phases, wherein for each of said plurality of phases, a corresponding one of said plurality of ramp control signals ramps in a first direction when a corresponding one of a plurality of pulse control signals is active and ramps in a second direction when said corresponding pulse control signal is inactive;

a comparator circuit that compares an output voltage error signal with a first one of said plurality ramp control signals and that provides a corresponding slope reset signal;

a frequency detector that periodically measures a period of a first one of said plurality of pulse control signals and that provides a period value indicative thereof;

a phaser circuit that divides said period value by a number of said plurality of phases to determine a phase delay and that senses transitions of said slope reset signal to provide a plurality of high side timing signals that are spaced apart by said phase delay and a plurality of low side timing signals that are spaced apart by said phase delay;

a plurality of high side ramp generators, each injecting one of a plurality of high side ramp signals into a corresponding one of said plurality of phases based on a corresponding one of said plurality of high side timing signals;

a plurality of low side ramp generators, each injecting one of a plurality of low side ramp signals into a corresponding one of said plurality of phases based on a corresponding one of said plurality of low side timing signals; and a plurality of comparators that compare each of said plurality of ramp control signals with a corresponding one of said plurality of high side ramp signals and a corresponding one of said plurality of low side ramp signals to control transitions of a corresponding one of said plurality of pulse control signals.

11. The injection locked phasing circuit of claim 10, further comprising a frequency control circuit that compares said period value with a predetermined frequency set value and that adjusts steady state switching frequency of each of said plurality of pulse control signals based on said predetermined frequency set value.

12. The injection locked phasing circuit of claim 10, wherein:
said comparator circuit detects when said first ramp control signal of the first phase crosses said output voltage error signal while said first pulse control signal of the first phase is active for transitioning said slope reset signal to a first state, and that detects when said first ramp control signal crosses said error signal while said first pulse control signal is inactive for transitioning said slope reset signal to a second state;
wherein said phaser circuit generates a first one of said high side timing signals when said slope reset signal transitions to said first state, and generates a first one of said low side timing signals when said slope reset signal transitions to said second state; and
wherein said phaser circuit determines a phaser threshold that represents said phase delay, wherein said phaser circuit generates an additional one of said plurality of high side timing signals for each phase of the regulator based on said phaser threshold and said first high side timing signal, and wherein said phaser circuit generates an additional one of said plurality of low side trigger signals for said each phase of the regulator based on said phaser threshold and said first low side timing signal.

13. The injection locked phasing circuit of claim 12, wherein:
said phaser circuit asserts each said corresponding high side timing signal after expiration of each of at least one phase delay after said first high side timing signal for each additional phase of the regulator; and
wherein said phaser circuit asserts each said corresponding low side timing signal after expiration of each of at least one phase delay after said first low side timing signal for each additional phase of the regulator.

14. The injection locked phasing circuit of claim 12, wherein said phaser circuit comprises:
a first ramp circuit that initiates a high side phaser ramp for each pulse of said first high side timing signal or for each pulse of a first trigger reset signal;
a first comparator that compares said high side phaser ramp with said phaser threshold and that provides said first trigger reset signal;
a first counter that increments a binary output with each pulse of said first trigger reset signal and that resets with each pulse of said first high side timing signal;
a first decoder having an input coupled to said binary output of said first counter and having a plurality of outputs; and
at least one first edge detector, each coupled to a corresponding one of said plurality of outputs of said first decoder for developing each additional high side timing signal.

15. The injection locked phasing circuit of claim 14, wherein said phaser circuit comprises:
a second ramp circuit that initiates a low side phaser ramp for each pulse of said first low side timing signal or for each pulse of a second trigger reset signal;
a second comparator that compares said low side phaser ramp with said phaser threshold and that provides said second trigger reset signal;
a second counter that increments a binary output with each pulse of said second trigger reset signal and that resets with each pulse of said first low side timing signal;
a second decoder having an input coupled to said binary output of said second counter and having a plurality of outputs; and
at least one second edge detector, each coupled to a corresponding one of said plurality of outputs of said second decoder for developing each additional low side timing signal.

16. An electronic device, comprising:
a multiphase regulator comprising a plurality of hysteretic PWM modulators each generating a corresponding one of a plurality of ramp control signals for transitioning a corresponding one of a plurality of pulse control signals;
a comparator that compares an output voltage error signal with one of said plurality of ramp control signals and that provides a corresponding slope reset signal;
a timing circuit that provides a period value indicative of a period of a first pulse control signal;
a phaser circuit that divides said period value by a number of said plurality of hysteretic PWM modulators to provide a phase delay, and that detects transitions of said slope reset signal to provide a plurality of high side trigger signals that are spaced apart by said phase delay and a plurality of low side trigger signals that are spaced apart by said phase delay;
a plurality of high side ramp generators, each injecting one of a plurality of high side ramp signals into a corresponding one of said plurality of hysteretic PWM modulators based on a corresponding one of said plurality of high side trigger signals; and
a plurality of low side ramp generators, each injecting one of a plurality of low side ramp signals into a corresponding one of said plurality of hysteretic PWM modulators based on a corresponding one of said plurality of low side trigger signals.

17. The electronic device of claim 16, wherein said phaser circuit generates a first high side trigger signal and a first low side trigger signal for a first hysteretic PWM modulator based on transitions of said slope reset signal, that generates an additional high side trigger signal for each of at least one additional hysteretic PWM modulator based on said first high side trigger signal and said phase delay, and that generates an additional low side trigger signal for each of said at least one additional hysteretic PWM modulator based on said first low side trigger signal and said phase delay.

18. The electronic device of claim 16, wherein said timing circuit develops said period value as a period voltage having a voltage level indicative of a period of said first pulse control signal, and wherein said phaser circuit comprises a voltage divider that divides said period voltage by said number of hysteretic PWM modulators to provide a phaser threshold that represents said phase delay.

19. The electronic device of claim 17, wherein said phaser circuit generates a second high side trigger signal for a second one of said plurality of hysteretic PWM modulators after said phase delay initiated in response to said first high side trigger signal, and wherein said phaser circuit generates a second low side trigger signal for said second hysteretic PWM modulator after said phase delay initiated in response to said first low side trigger signal.

20. The electronic device of claim 17, wherein said phaser circuit generates at least one additional high side trigger signal after said first high side trigger signal for each additional hysteretic PWM modulator, wherein said each additional high side trigger signal is separated in time by said phase delay, and wherein said phaser circuit generates at least one additional low side trigger signal after said first low side trigger signal for said each additional hysteretic PWM modulator, wherein said each additional low side trigger signal is separated in time by said phase delay.

21. The electronic device of claim 16, further comprising a processor and memory coupled to said peak-valley multiphase regulator.

* * * * *